United States Patent [19]

Michalek

[11] Patent Number: 4,655,950
[45] Date of Patent: Apr. 7, 1987

[54] FOAMED CAST ACOUSTICAL MATERIAL AND METHOD

[75] Inventor: Christopher P. Michalek, Lake Zurich, Ill.

[73] Assignee: United States Gypsum Company, Chicago, Ill.

[21] Appl. No.: 689,333

[22] Filed: Jan. 7, 1985

[51] Int. Cl.[4] ............................ C08J 9/30; C08J 5/08; E04B 1/86
[52] U.S. Cl. .................... 252/62; 264/45.3; 264/50
[58] Field of Search ................ 264/50, 45.3; 252/62

[56] References Cited

U.S. PATENT DOCUMENTS

| 1,769,519 | 7/1930 | King et al. | 264/86 |
| 1,996,032 | 3/1935 | Roos | 106/36 |
| 1,996,033 | 3/1935 | King | 106/36 |
| 3,090,699 | 5/1963 | Bulson | 106/214 |
| 3,103,444 | 9/1963 | Cotts | 106/71 |
| 3,114,671 | 12/1963 | Eberle | 162/155 |
| 3,184,372 | 5/1965 | Cotts | 162/145 |
| 3,489,827 | 1/1970 | Mueller et al. | 264/50 |
| 3,510,394 | 5/1970 | Cadotte | 162/145 |
| 3,562,370 | 2/1971 | Shannon | 264/45 |
| 3,667,687 | 6/1972 | Rivkins et al. | 239/553.3 |
| 3,716,449 | 2/1973 | Gatward et al. | 162/101 |
| 3,814,816 | 6/1974 | Gunther | 426/46 |
| 3,980,613 | 5/1974 | Bachot et al. | 264/45.3 |
| 4,104,435 | 8/1978 | Ballesteros | 428/288 |
| 4,187,066 | 5/1980 | Hobson et al. | 425/327 |
| 4,226,911 | 10/1980 | Haren | 428/375 |
| 4,229,406 | 10/1980 | Pollock | 264/321 |
| 4,248,810 | 2/1981 | Erskine | 264/43 |
| 4,320,202 | 3/1982 | Yamamoto et al. | 501/80 |
| 4,390,450 | 6/1983 | Gibson et al. | 252/307 |

OTHER PUBLICATIONS

Tappi, Jan. 1974, vol. 57, No. 1, pp. 107-111.
Tappi, May 1972, vol. 55, No. 5, pp. 748-751.
1967 L. E. Revkind "Improved Technology for Rigid Inorganic Foams".

Primary Examiner—Philip Anderson
Attorney, Agent, or Firm—Kenneth E. Roberts; Robert H. Robinson; Robert M. Didrick

[57] ABSTRACT

A lightweight cast acoustical material requiring less drying time and energy is obtained by lightly cooking an aqueous slurry of starch, cooling it to about less than 140° F., whipping air into it, adding granulated mineral wool with thorough mixing to form a foam, casting the resultant wet foamed pulp into a form and drying the formed pulp to an acoustical product. The web pulp has an about 40 weight % reduction in water content, resulting in considerable savings in drying time and energy.

15 Claims, No Drawings

FOAMED CAST ACOUSTICAL MATERIAL AND METHOD

BACKGROUND OF THE INVENTION

1. Field of the Invention

This invention relates to sound absorbing or acoustical material and a method of manufacturing same. More particularly it has reference to sound absorbing compositions manufactured from a wet mineral wool pulp that is cast or molded into the form of tile.

Wet pulp molded acoustical tiles are not novel per se. U.S. Pat. Nos. 1,996,033 and 1,769,519 describe compositions and a method of wet forming a molded acoustical tile from a thick aqueous pulp of starch and granular mineral wool. First a starch gel binder is formed by cooking a starch solution and optional fillers and colorants to a thick gel and then granulated mineral wool is added to form a thick wet pulp. The set pulp contains about 80%–95% by volume (about 65%–71% by weight) water, which is necessary to give rise to proper forming properties of the wet pulp and the acoustical nature of the product. During drying, the water is removed resulting in voids that give rise to the highly porous nature and excellent sound absorbing character. The rising cost of energy and the lengthy times involved in drying have led to considerable interest in means to reduce the water required without sacrifice to the porous nature and sound absorbing character of these products. Drying costs and time are proportional to the amount of water removed. Attempts to merely reduce water lead to extremely viscous binder gel difficult to mix properly and insufficient strike-in of the binder into the granulated wool. Previous attempts have bee made to introduce separately generated foams into the wet pulp mix. These efforts so far have failed, as either the foam broke down during mixing into the viscous pulp or the resultant tile was weak and of insufficient dry strength.

The cast products described above utilize a viscous cooked starch solution to impart desired rheological properties and permit proper surface fissure formation upon screeding. The starch is also the binder for the mineral fiber and controls density of the products. In adding a separately generated foam, the main problem is keeping the foam intact after mixing. Previous attempts with numerous stable foams showed the foams very quickly collapsed on attempts to mix with the stiffened pulp. Pulp becomes extremely stiff when prepared with as little a reduction as 20% less water. Chemical additions to liberate gas bubbles generally degraded the starch binder or completely attacked and ruined either the mineral wool or the starch binder. Attempts to in situ foam with conventional surfactants resulted in either total loss of binder strength in the dried board or formed a mono-layer on the wool preventing starch bonding from forming.

Thus it remains an object and advantage of the present invention to reduce the water required for molded acoustical mineral wool products while maintaining desirable rheological properties and, in particular, dry strength. Another object and advantage is to provide a method of manufacturing molded acoustical tile utilizing an about 40% reduction in the water required to be dried from the wet pulp. Still another object and advantage of this invention is to provide a molded acoustical product encountering less edge warpage or bending during drying.

SUMMARY OF THE INVENTION

The above objects and advantages, and others which will become apparent from the ensuing, are basically accomplished in the present invention by foaming the starch solution, cooked with only about one-half the customary water in the presence of an enzyme protein extract from bacterially fermenting soya flour. More particularly the customary starch gel binder is only lightly cooked in the presence of about one-half the conventional water and the soya protein whipping agent as foaming agent and then cooled to a temperature of about 100°–140° F. before being whipped to a foam. Thereupon the customary amounts of mineral wool, preferably not containing oily dust control ingredients, is added with continued thorough mixing to maintain the foam and the mixture formed into shape for drying.

DESCRIPTION OF THE PREFERRED EMBODIMENTS

Currently cast acoustical tile is made by adding a thickened starch, water and additives solution to mineral wool. This is mixed until a pulp density the consistency of papier-mache or oatmeal is reached. This pulped mineral wool is then distributed on trays; the surface is screeded to impart a surface texture, and the wet pulp is conventionally dried in ovens at about 300° F. for about 16 hours. The water content of the pulp is 95% by volume. As water is evaporated from the pulp, the mineral wool fibers are bonded to each other by the starch gel binder as it penetrates the interstices of the wool fibers as the water evaporates, coats the fibers, and dries. The drying board or tile retains the dimensions of the cast pulp in volume with only negligible shrinkage, as the cast material dries from the outside in; leaving a strong, starch bonded mineral wool structure that defines the shape of the finished tile. After the water evaporates, air spaces remain in between the mineral wool fibers where the liquid had been. The amount of these air spaces affects the density and sound attenuation properties of the finished ceiling board. Customary drying time for the boards is about 16 hours at 300° F.

However amphoteric enzyme modified soy protein can effectively foam the cooked starch gel with upwards of 40% water removed, as well as foam the pulp when mineral wool is added to the gel; and the finished foamed board had strengths as good or better than conventional board. The foaming agent is a food additive whipping agent that is an enzyme modified soy protein. Preferred foaming agents for use in the present invention are pepsin modified hydrolyzed soy protein, such as those set forth in U.S. Pat. No. 3,814,816. Most preferably the proteinaceous foaming agent is further hydrolyzed with small amounts of water-soluble alkaline earth metal salt and water-soluble zinc salt, such as set forth in U.S. Pat. No. 4,390,450. Suitable enzyme modified soy protein are available from Gunther Products Protein Division of A. E. Staley Manufacturing Company under designations such as GUNTHER FC-47.

It is not possible to merely decrease the amount of the starch binder in the water for the gel binder, since this would reduce the overall binder per volume unit of board produced and thereby cause loss of board strength. Further when water is removed from the pulp formulation the starch solids, that have remained the same, will make a very thick gel. At 40% water reduction the viscosity of this gel would be too thick for effective control of formulation and handling. This was overcome in the present invention by undercooking the starch gel. Normally the starch is cooked at 180° F. or above and held for 5 minutes. It is preferred in the present invention to cook the starch at about 170°–174° F. for 5 minutes to result in a gel of the correct viscosity for foaming after cooling to about 100°–110° F. The temperature of cooking affects volume of foam, as reflected by density, and quality of foam. By reducing cook temperatures, better foaming, as well as better binder distribution in the board, is accomplished. If the gel is cooked substantially below about 170° F., it will not act as an effective binder. If the gel is cooked substantially above 175° F. the gel is too viscous for thorough intermixing with the mineral wool and insufficient strike-in of binder will result. Of course a portion, say about one-half, of the raw starch may be replaced with pre-cooked starches, provided they are given vigorous dispersion and sufficient time to completely hydrolyze (about 20 minutes). Higher viscosities will produce a more stable foam but entrain less air, form smaller air voids and reduce acoustic properties. Lower viscosities entrain more air and form lighter but less stable foams with larger bubble sizes.

Preferably before mixing with the mineral wool, the starch or starch blend is pre-foamed. This increases the volume of the gel. and gel volume directly controls the final density of the dried board. It also aids in dispersing the reduced volume of gel into the mineral fibers, and shortens pulp mixing time. To foam effectively with the enzyme modified soy protein, the cooked gel should be cooled below 140° F., preferably to about 100°–110° F. Higher temperatures affect foamability so much that a normally foamable gel will not foam at all, for example, at 160° F., but will continue to mix unfoamed until cooled to a temperature low enough to begin foaming.

Contaminants and known defoamers, such as oils, fats and waxes, along with some acids should be avoided in any conventional adjuvants used. Along this line, the mineral wool often is supplied with a dust inhibiting coating applied. Such should be avoided if it is of an oily nature. It has been found that mineral wools that have a polyethylene glycol or glycerine substituted for the dedusting oil does not interfere with foaming.

The method of agitation will influence both the quantity and stability of foam generated. Foaming is accomplished when a large volume of air is introduced into the foamable substrate, and is chopped into smaller and smaller units. A continuous type mixer where the gel is pumped under high pressure with air into a rotor and stator, whereupon additional air is preferably mixed in is suitable. A heavy duty planetary action type mixer equipped with whisks, in contrast to the usual paddles, is more preferred. A desirably stable and medium staff foam will result upon mixing for 2–3 minutes. This initial gel foaming is believed to be particularly desirable in the present invention to give greater volume of gel in the pulp for "strike-in" and better coating upon the mineral wool with the binder. The gel foam and mineral wool are then combined and foamed again; cast into trays, and dried. This material dries in 8 ∝ 9 hours at 300° F., in contrast to 16 hours for unfoamed formulation.

EXAMPLE 1

In one series of evaluations, aliquots of 8 parts by weight of F.C. 47 proteinaceous extract from A. E. Staley and 162 parts pearl corn starch were throughly mixed into 1412 parts of water then heated with thorough agitation to temperatures ranging from 165° F. to 175° F. and held for 5 minutes. The cooked gels had viscosities ranging from 175 to about 480 Braebender Units. The cooked gels were cooled to 100° F.–110° F. then foamed with a large balloon whisk on a high speed setting in a Hobart planetary action mixer for 2–3 minutes. Gel foam densities were about 0.1–0.3 g/cc. This initial gel foaming is believed important to give a greater volume of gel to "strike-in" better to the mineral wool with a larger surface area of binder. Mineral wool in an amount of 700 parts along with an additional 310 parts of water were added with continued agitation to re-foam the mixture at high speed setting for 2–3 minutes. The foamed pulps, which had texturable characteristics similar to unfoamed controls without the extract and conatining the full 2870 parts of water, were then cast in tile trays and dried at 300° F. in an exhausted forced air oven. These formulations dried in about 9 hours, compared to 16 for the control formula. The dried finished boards had densities ranging from 18 to 23 g/cc compared to 23 for the control and modulus of rupture values ranging from 155 to 284 psi compared to 200 for the control.

In a second series of evaluations various raw starches, precooked starches and blends in amounts of about 5–10 weight percent were used to produce good foams and effective binding. Those pregelled starches containing oil fractions formed less stable and less firm foams. Pre gel potatoe starch appeared to act as a foaming stabilizer and to add lubricity to the pulp forming a more flexible binder film when dried.

In a third series of evaluations it was found unnecessary to refoam the pulp after addition of the mineral wool when oil antidusting coatings upon the mineral wool were eliminated. By using oil-free mineral wool, such as cryogenic mineral wool, or various polyethylene glycols, such as PEG 600 having a molecular weight of 6000, or glycerine and the like materials on the wool allows the gel foam to be added to mineral wool pulps in extruder or ribbon type mixers without collapse of foam.

EXAMPLE 2

In a large plant-size trial, 21 pounds (lb.) of pearl starch, 7.07 lb. pre-cooked potatoe starch and 0.86 lb. of boric acid were heated to 170°–172° F. in 330 lb. water in a 100 gallon holding tank. With stirring, 1.84 lb. proteinaceous extract whipping agent (FC 47 from A. E. Staley) and 22.44 lb. inorganic mineral filler and colorants were added, the mixture was cooled to 110° F., and then foamed in a 14 inch head Oakes foamer to an average density of 0.15 g/cc. The gel foam was mixed with mineral wool, having an antidusting coating of 30 percent solution polyethylene glycol having a molecular weight of 4000, in gel: wool weight ratio of 2.6:1 in a large ribbon blender to produce a pulp of 0.78 g/ml density that was cast to ⅛th inch thickness in tile trays. The formulation used about 40% less water than conventional, and dried in about ⅔ths conventional time to a finished acoustical ceiling board product having a density 3 pounds per cubic foot less than the conventional product. It was observed in removing the dried board from the trays and in further handling that the finished boards were more planar than the conventional product. There was visibly less edge warpage and bending to these boards during drying than in conventional product.

While the amount of foaming agent used in this example was 6.15 wt. % based on the weight of starch, more generally amounts from about 3 wt. % through about 8% may be used depending upon the length of mixing time and foam stability that are desired for particular starches and mineral wools. The lower amounts increase the mixing time to develop foams and produce more fragile foams; and higher amounts develop more stable foams in less mixing time. More or less than these amounts may be used without substantial further advantage.

What is claimed is:

1. The process of forming a lightweight cast mineral wool acoustical tile of the type in which:
   (a) a binder gel is formed by cooking an aqueous starch solution,
   (b) granular mineral wool is added to the binder gel and thoroughly mixed to form a wet pulp,
   (c) the wet pulp is cast into a shaped form to form a tile article,
   and (d) the cast pulp is dried at about 300° F. for about 16 hours; the improvement therein of producing a reduced density product in reduced drying time comprising:
   (1) forming the starch solution with about 0.5% based on total composition of protein extract of soya flour and only about 60% of the conventional amount of water;
   (2) cooking the starch solution at lower than conventional temperature to form the binder gel;
   and (3) agitating the binder gel to a foam.

2. The process of claim 1 in which the protein extract is a pepsin modified hydrolyzed soya protein.

3. The process of claim 2 in which the hydrolyzate contains an alkaline earth metal salt and a water-soluble zinc salt.

4. The process of claim 1 in which the mineral wool contains an oily antidusting agent and in step (b) the wool and foam gel are mixed to refoam the pulp.

5. The process of claim 4 in which the wool and gel are mixed in a planetary type mixer.

6. The process of claim 1 in which the mineral wool does not contain an oily antidusting agent and in step (b) the mineral wool and foam gel are mixed in a ribbon blender.

7. The process of claim 6 in which the mineral wool is coated with an antidusting agent selected from the group consisting of polyethylene glycol and glycerine.

8. The process of claim 1 in which in step (d) the pulp is dried for about 8 hours.

9. The process of claim 1 in which in step (2) the starch is cooked at about 165° F.-175° F. for about 5 minutes.

10. The process of claim in which between steps (2) and (3) the cooked starch is cooled to about 100° F.-140° F. before foaming the starch gel.

11. The process of claim 10 in which the cooked starch is cooled to about 100° F.-110° F.

12. A lightweight cast mineral wool acoustical tile consisting essentially of the dried solids of a major weight proportion of mineral wool and starch binder, and about 3%-8% by weight of protein extract of soya flour based on the weight of starch.

13. The acoustical tile of claim 12 in which the protein extract is a pepsin modified hydrolyzed soya protein.

14. The acoustical tile of claim 13 in which the hydrolyzate contains an alkaline earth metal salt and a water-soluble zinc salt.

15. The acoustical tile of claim 12 containing about 5 weight % of the protein extract.

* * * * *